United States Patent [19]

Tsujiuchi et al.

[11] Patent Number: 4,956,946
[45] Date of Patent: Sep. 18, 1990

[54] NUMERICALLY CONTROLLED GRINDING MACHINE

[75] Inventors: Toshio Tsujiuchi, Kariya; Norio Ohta, Okazaki; Masatomo Yoshimura, Toyoake, all of Japan

[73] Assignee: Toyoda Koki Kabushiki Kaisha, Kariya, Japan

[21] Appl. No.: 322,300

[22] Filed: Mar. 13, 1989

[30] Foreign Application Priority Data

Mar. 15, 1988 [JP] Japan ................................ 63-60794

[51] Int. Cl.⁵ ............................................. B24B 49/05
[52] U.S. Cl. ................................ 51/165.71; 51/165.77
[58] Field of Search .......... 51/165.71, 165.74, 165.76, 51/165.77, 165.93, 165.8, 165.83

[56] References Cited

U.S. PATENT DOCUMENTS

| | | | |
|---|---|---|---|
| 3,171,234 | 3/1965 | Hill | 51/165.83 |
| 3,597,888 | 8/1971 | Kusakabe et al. | 51/165.77 |
| 3,924,355 | 12/1975 | Tatsumi et al. | 51/165.77 |
| 4,053,289 | 10/1977 | Tatsumi | 51/165.77 |
| 4,214,309 | 7/1980 | Koide et al. | 51/165.71 |
| 4,265,054 | 5/1981 | Ito | 51/165.93 |
| 4,461,121 | 7/1984 | Motzer et al. | 51/165.71 |
| 4,478,009 | 10/1984 | Rukavina et al. | 51/165.8 |
| 4,524,547 | 6/1985 | Heaston et al. | |
| 4,584,796 | 4/1986 | Yoneda et al. | 51/165.71 |
| 4,590,573 | 5/1986 | Hahn | 51/165.71 |
| 4,662,122 | 5/1987 | Ohmura et al. | 51/165.71 |
| 4,773,187 | 9/1988 | Ohta et al. | 51/165.71 |

*Primary Examiner*—William E. Terrell
*Assistant Examiner*—Mark F. Frazier
*Attorney, Agent, or Firm*—Oblon, Spivak, McClelland, Maier & Neustadt

[57] ABSTRACT

A numerically controlled internal grinding machine for grinding a workpiece by a rough grinding operation with a rough grinding wheel and a finish grinding operation with a finish grinding wheel. The grinding machine detects the load power of a motor which drives the finish grinding wheel in order to determine a compensation value to enable subsequent compensation due to wear of the rough grinding wheel. In the successive rough grinding operation, the relative position of the workpiece is compensated for according to the determined compensation value, so that the diameter of the workpiece after the rough grinding operation is maintained at a desired constant value regardless of the wear of the rough grinding wheel.

11 Claims, 5 Drawing Sheets

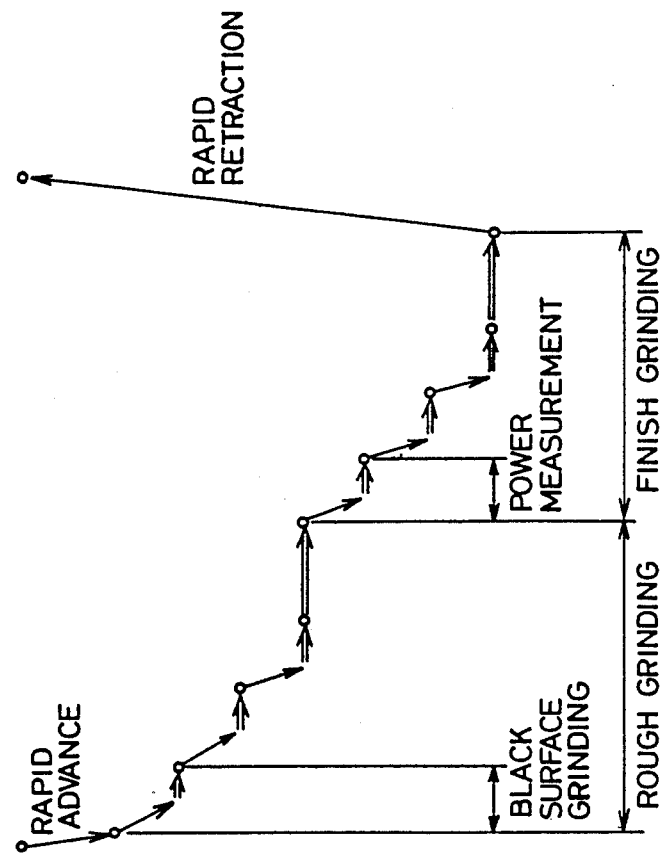

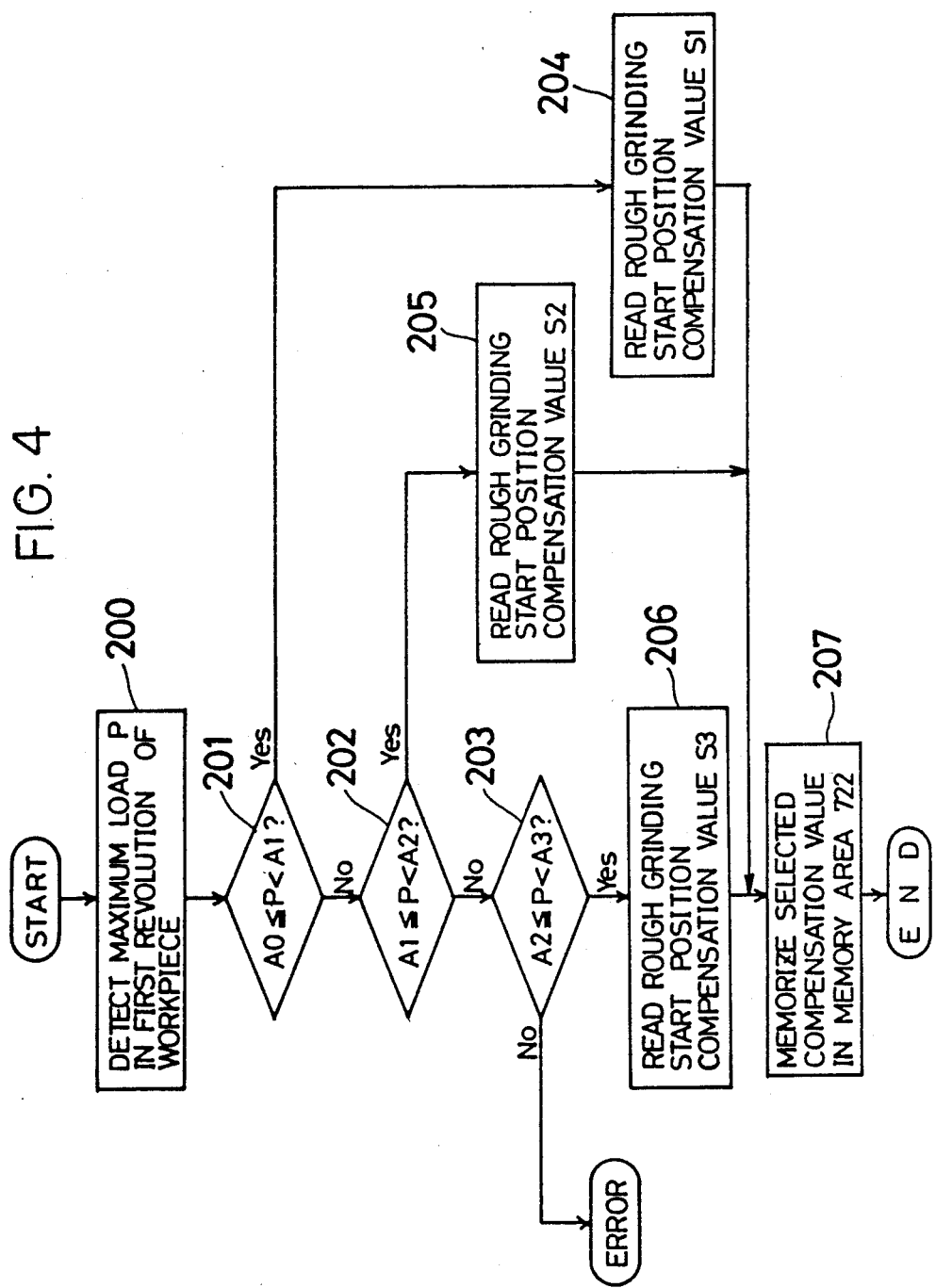

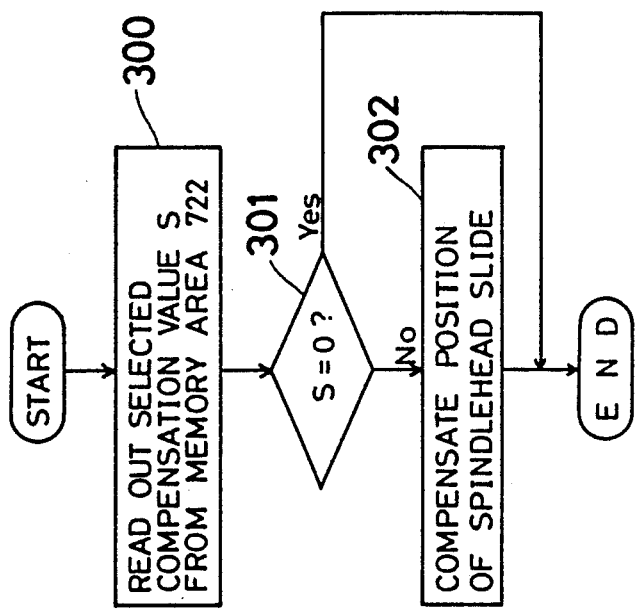

NUMERICALLY CONTROLLED GRINDING MACHINE

BACKGROUND OF THE INVENTION

1. Field of the Invention:

The present invention relates to a numerically controlled grinding machine capable of machining a workpiece according to numerical control data. More specifically, the invention relates to a numerically controlled grinding machine capable of machining a workpiece by a rough grinding operation and a finish grinding operation.

2. Description of the Prior Art:

In a numerically controlled grinding machine such as a numerically controlled internal cam grinder, two different grinding wheels, i.e. a rough grinding wheel and a finish grinding wheel, are used for the rough grinding operation and the finish grinding operation, respectively. In such a grinding machine, the rough grinding operation is accomplished in such a way that an unground portion equal to a predetermined finish allowance remains after rough grinding. Then, the unground portion is ground in the finish grinding operation in order to produce a predetermined final cam profile on the workpiece.

In such a numerically controlled internal cam grinder, however, only the finish grinding wheel is dressed in the successive machining operation. Namely, dressing for the rough grinding wheel is usually omitted so as to shorten the machining cycle time. Accordingly, the unground portion which remains after the rough grinding operation becomes larger than the finish allowance when the wear of the rough grinding wheel occurs. However, the finish grinding wheel is positioned according to numerical control data, which are programmed based upon the theoretical finish allowance, regardless of the amount of the unground portion after the rough grinding operation. As a result, the wheel spindle which supports the finish grinding wheel is bent by the grinding force which changes depending on the amount of the unground portion after the rough grinding operation. The bending of the wheel spindle causes the grinding resistance in the finish grinding operation to change, so that it becomes difficult to grind workpieces accurately in a short period of time.

SUMMARY OF THE INVENTION

Accordingly, it is a primary object of the invention to provide an improved numerically controlled grinding machine capable of increased machining accuracy.

Another object of the invention is to provide an improved numerically controlled grinding machine capable of leaving an unground portion of a constant amount after a rough grinding operation regardless of the wear of a rough grinding wheel.

These and other objects are achieved according to the present invention by providing a new and improved numerically controlled grinding machine for machining a workpiece by a rough grinding operation and a finish grinding operation, including grinding load detecting means capable of detecting the grinding load of the grinding wheel during the finish grinding operation in order to indirectly determine the amount of the unground portion of the workpiece remaining after the rough grinding operation, and means for compensating the relative positional relationship between the rough grinding wheel and the workpiece according to the magnitude of the detected grinding load, in a successive rough grinding operation. As a result, the relative position of the grinding wheel with respect to the workpiece is compensated for the wear of the rough grinding wheel so that the diameter of the workpiece after the rough grinding operation is maintained at a desired constant value regardless of the wear of the rough grinding wheel.

According to another aspect of the invention, the load power of the motor which drives the finish grinding wheel is detected as the grinding load during the finish grinding operation. For example, the maximum load power of the motor is detected in the first revolution of the workpiece during the finish grinding operation.

According to another aspect of the invention, the numerical controller of the grinding machine stores plural rough grinding start position compensation values corresponding to the magnitude of the load power. The numerical controller selects one of the compensation values depending upon the detected load power, and compensates for positional relationship between the grinding wheel the workpiece.

BRIEF DESCRIPTION OF THE DRAWINGS

A more complete of the invention and many of the attendant ad thereof will be readily obtained as the same becomes better understood by reference to the following detailed description when considered in connection with the accompanying drawings, wherein:

FIG. 3 is an explanatory chart which shows grinding steps performed according to the present invention; and FIGS. 4 and 5 are flow charts explaining the operation of the CPU of the numerical controller shown in FIG. 2.

DESCRIPTION OF THE PREFERRED EMBODIMENTS

Figure 1:
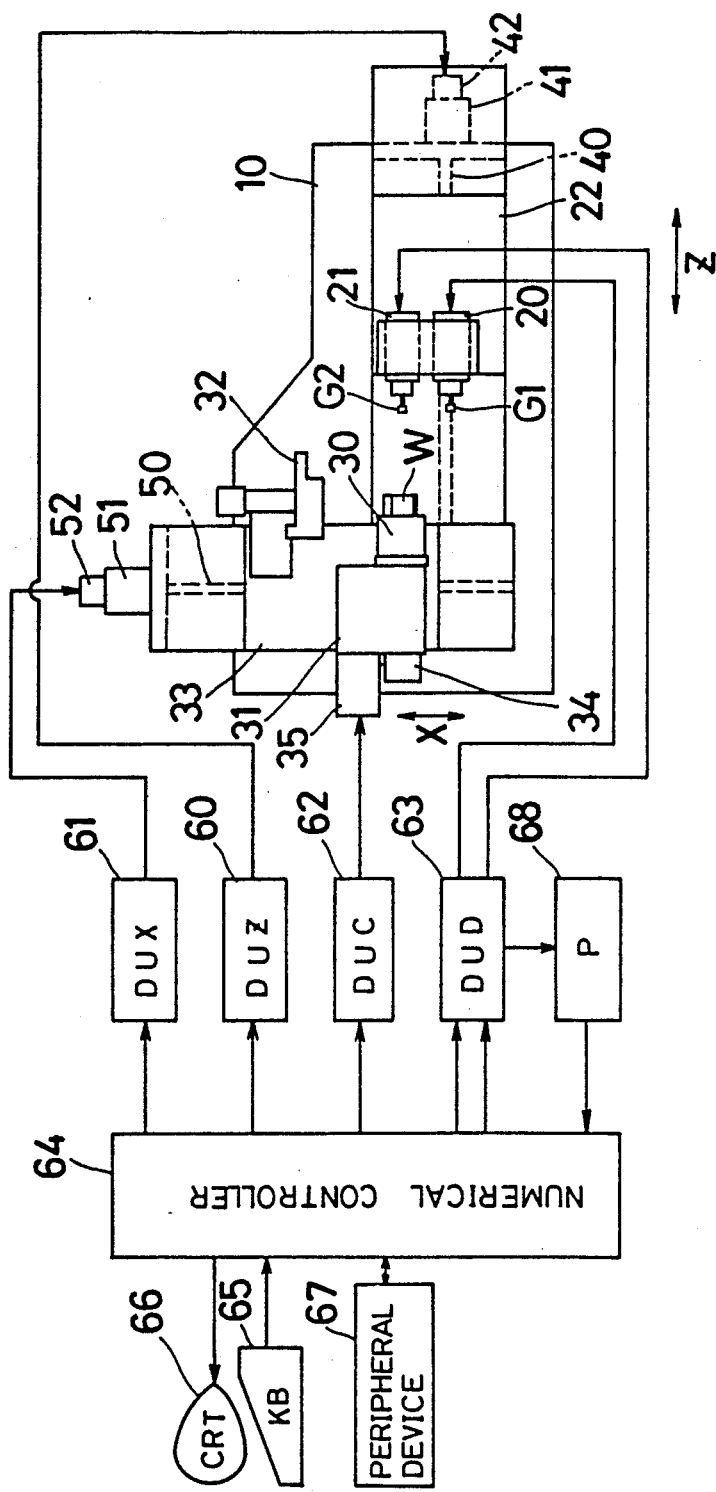
FIG. 1 is a schematic view of a numerically controlled cam grinder according to the present invention.
Figure 2:
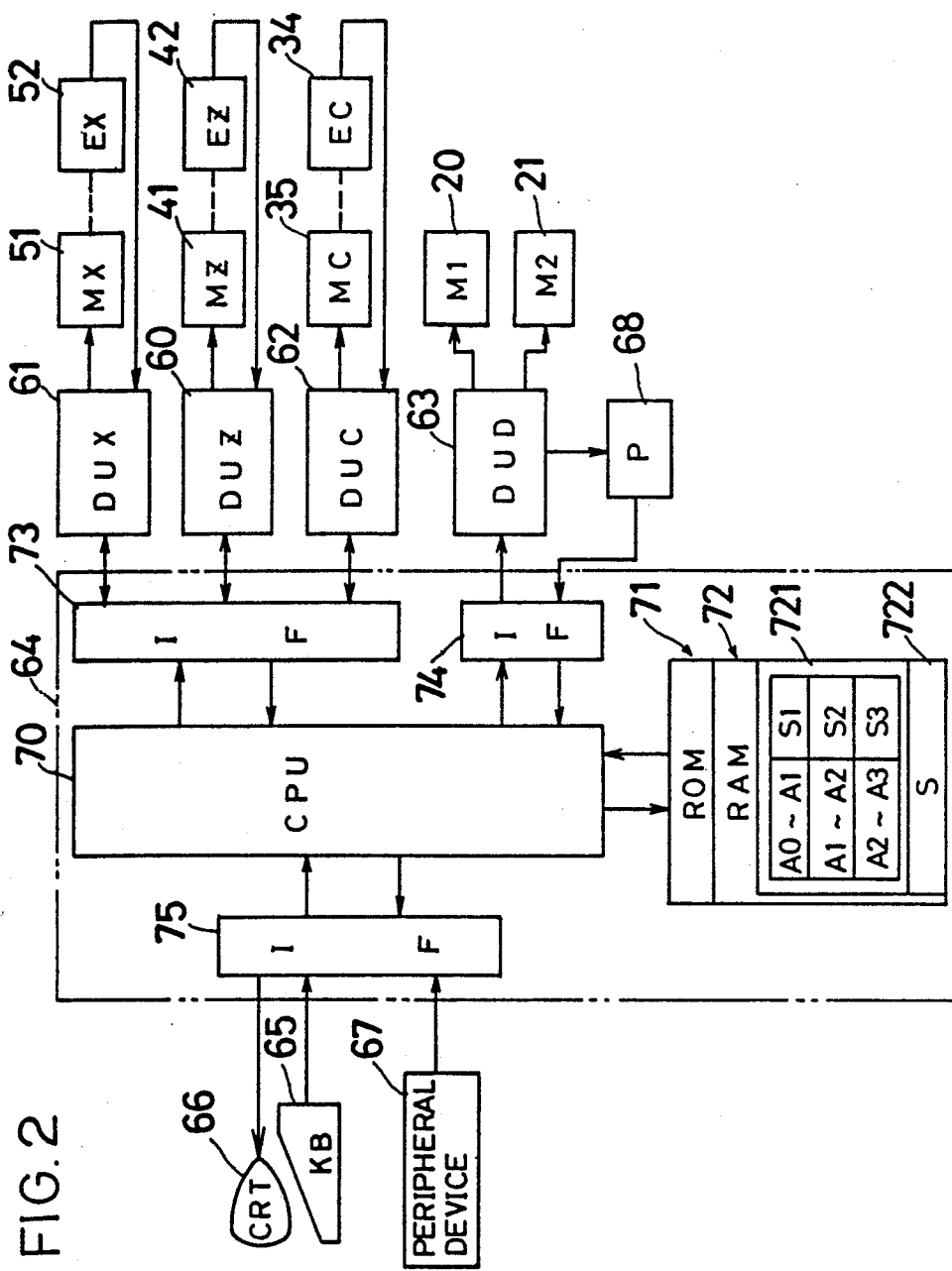
FIG. 2 is a block diagram showing the structure of the numerical controller shown in FIG. 1.

Referring now to the drawings wherein like reference numerals refer to identical or corresponding parts throughout the several views, and more particularly to FIG. 1 thereof, a numerically controlled grinder is shown comprising a bed 10, on which a wheelhead slide 22 and a spindlehead slide 33 are mounted. A motor 20 supporting a rough grinding wheel G1 and a motor 21 supporting a finish grinding wheel G2 are mounted on the wheelhead slide 22. A spindlehead 31 provided with a chuck 30 supporting a workpiece W and a dresser 32 for dressing the grinding wheel are mounted on the spindlehead slide 33.

The wheelhead slide 22 is moved by a feed screw 40 driven by a servomotor 41 so that the grinding wheels G1 and G2 are moved along a Z axis against the workpiece W. The spindlehead slide 33 is moved by a feed screw 50 driven by a servomotor 51 so as to be moved along an X axis.

Numerals 60, 61 and 62 indicate drive units which drive servomotors 41, 51 and 35, respectively, in response to command pulses output by the numerical controller 64. The servomotor 35 rotates the chuck 30, i.e., the workpiece W. Numeral 63 indicates a drive unit which starts and stops motors 20, 21 in response to command signals output by the numerical controller 64.

Moreover, position sensors 42, 52 and 34 composed of rotary encoders are connected to the servomotors 41, 51 and 35, respectively. The positional output signals generated by the position sensors 42, 52, 34 are fed back to the drive units 60, 61 and 62, respectively, in order to accomplish servomotor control with the fed back signals. The numerical controller 64 simultaneously controls the rotations of the servomotors 41, 51 and 35 in order to control the grinding operation for the workpiece W.

Further, a keyboard 65 for inputting cam lift data, NC profile data, machining program and the like, a display device 66 for displaying various information, and a peripheral device 67 such as tape reader, external memory device and the like are connected to the numerical controller 64.

Numeral 68 indicates a power sensor for detecting the current and voltage of electricity supplied to the motor 21 which drives the finish grinding wheel G2. The power sensor 68 calculates the electrical power consumed by the motor 21 by multiplying the detected current value by the detected voltage value, and outputs the calculated electrical power as the load power of the motor 21. The power sensor 68 detects the power of the motor 21 during the finish grinding operation, and the output signal of the power sensor 68 is fed to the numerical controller 64 via a D/A converter (not shown). The load power of the motor 21 indicates the grinding load of the finish grinding wheel G2.

The numerical controller 64 includes a main central processing unit (hereinafter referred to as a "main CPU") 70, a memory composed of a ROM 71 and a RAM 72, and input/output interfaces 73, 74, 75.

The ROM 71 stores a control program, and the RAM 72 stores input data, machining programs and the like.

Furthermore, a memory area 721 is formed in the RAM 72 in order to memorize three rough grinding start position compensation values S1, S2, and S3 corresponding to the ranges of load power of the motor 21, which is detected during the finish grinding operation. Namely, the compensation values indicate compensating amounts of the start position to be compensated at the successive rough grinding operation in order to reduce the unground portion after the rough grinding operation. Each compensation value is determined by calculations or experiments in such a way that the amount of the unground portion after the rough grinding operation becomes the finish allowance or approaches the finish allowance. Numeral 722 refers to a selected position compensation value memory area for temporarily storing a rough grinding start position compensation value, which is selected based upon the detected maximum load power P, in order to be used for positional compensation in the successive machining operation.

The operation of the CPU 70 of the numerical controller 64 will be explained. In this embodiment, a cam formed inside of the workpiece W shown in FIG. 1 is ground by rough and finish grinding operations according to the grinding steps shown in FIG. 3.

The rough grinding wheel G1 is moved to a grinding start position by a rapid feed, and then the rough grinding operation is accomplished. At first, the rough grinding wheel G1 is fed by a predetermined amount in order to grind the black surface of the workpiece W. After that, the grinding wheel G1 is further fed according to a predetermined rough grinding steps in order to complete the rough grinding operation.

Thereafter, the finish grinding wheel G2 is positioned to a machine start position, and is fed by predetermined finish grinding steps in order to accomplish the finish grinding operation. During the first feed step of the finish grinding operation, the load power of the motor 21 is detected in order to measure the maximum load power P of the motor 21 in the first rotation of the workpiece W during the first feed step.

Namely, the above described load power measurement is executed in a compensation value selecting process shown in FIG. 4. The compensation value selecting process is executed in response to a M code, for example M28, programmed with a feed command, which commands the first feed step of the finish grinding operation.

At step 200 of the compensation value selecting process, the load power detected by the power sensor 68 is input at a constant time interval during the first revolution of the workpieces W in the first feed step. Then, the peak value of the load power is detected as a maximum load power P. Thereafter, one of the compensation values S1, S2 and S3 is selected corresponding to the maximum load power P in steps 201~206.

At step 201, it is ascertained whether or not the inequality $A0 \leq P < A1$ is true. If it is true, the process moves to step 204 in order to read out the compensation value S1 from the memory area 721 of the memory 72. On the other hand, if the inequality $A0 \leq P < A1$ is not true, the process moves to step 202 in order to ascertain whether or not the inequality $A1 \leq P < A2$ is true. If it is true, the process moves to step 205 in order to read out the compensation value S2 from the memory area 721.

Furthermore, if the $A1 \leq P < A2$ is not true, the process moves to step 203 in order to ascertain whether or not the inequality $A2 \leq P < A3$ is true. If it is true, the process moves to step 206 in order to read out the compensation value S3 from the memory area 721. If the inequality $A2 \leq P < A3$ is not true, it is ascertained that the detected load power is out of the range A1~A3, and an error message is displayed on the display device 66.

At step 207, one of the compensation values S1, S2 and S3 selected in the steps 204~206 is stored in the selected position compensation value memory area 722 of the memory 72.

If the next workpiece is machined under the condition that the compensation value S is stored in the memory area 722, the relative position of the rough grinding wheel G1 with respect to the workpiece W is automatically compensated. Namely, at the beginning of the rough grinding operation, the compensation process shown in FIG. 5, in which the rough grinding start position is compensated for according to the compensation value S, is executed.

At step 300, the compensation value S is read out from the memory area 722. Thereafter, it is ascertained whether or not the compensation value S is zero. If it is not zero, the process moves to step 302 in order to compensate the relative position of the rough grinding wheel G1 with respect to the workpiece W. In this embodiment, the compensation is accomplished by moving the spindlehead slide 33 along the X axis by an amount equal to the compensation value S. As a result, the rough grinding wheel G1 is positioned to a new compensated start position relative to the original rough grinding start position. Thereafter, until the grinding wheel G1 exhibits further out-of-tolerance wear, all new grinding operations using the same grinding wheel G1 commence operation from the new compensated start position. Subsequent wear of the rough grinding wheel results in further compensation, depending upon the amount of wear, in each case by means of further movements of the start position of the rough grinding wheel closer to the workpiece. Thus, each subsequent rough grinding operation using the same rough grinding wheel starts from either the same starting position of the previous grinding operation if no further out-of-tolerance wear has occurred or a new starting position closer to the workpiece in dependence on the most recent compensation value S determined. Once positioned at the latest compensated start position, the rough grinding wheel is fed according to the regular rough grinding steps.

If the compensation value S is zero, the process is finished in order to complete the compensation process and to start regular grinding steps shown in FIG. 3.

As described above, the compensation value is selected in the steps 200~206 depending upon the maximum load power P of the motor 21 during the finish grinding operation, which changes depending upon the amount of wear of the rough grinding wheel G1. Then, the selected compensation value is stored in the compensation value memory area 722 in order to compensate for the relative positional relationship between the rough grinding wheel G1 and the workpiece W by the process of steps 300~302.

Accordingly, variation in the diameter of the workpiece after the rough grinding operation can be eliminated regardless of the wear of the rough grinding wheel, and the grinding resistance during the finish grinding operation can be maintained at a desired constant value. As a result, workpieces can be ground accurately in a short period of time.

In the above mentioned embodiment, the spindlehead slide is moved in order to compensate for the relative positional relationship between the rough grinding wheel and the workpiece. The relative positional relationship, however, can be compensated for by moving the wheelhead slide or changing wheel diameter data for the rough grinding wheel, which is used in the calculation of the feed amount in the rough grinding operation.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A numerically controlled grinding machine having a wheelhead slide supporting a rough grinding wheel and a finish grinding wheel, and a spindlehead slide supporting a workpiece, in which relative movement is produced between said wheelhead and spindlehead slides and said workpiece according to numerical data in order to grind said workpiece by a rough grinding operation with said rough grinding wheel and a finish grinding operation with said finish grinding wheel, said numerically controlled grinding machine comprising:

means for detecting a grinding load of said finish grinding wheel at the beginning of said finish grinding operation in order to indirectly detect the amount of unground portion remaining after the rough grinding operation;

means for determining a compensation value based upon said grinding load detected by said grinding load detecting means; and means for compensating the relative positional relationship between said rough grinding wheel and said workpiece according to said determined compensation value in a next rough grinding operation for a next workpiece in order to keep the amount of unground portion remaining after the rough grinding operation constant.

2. A numerically controlled grinding machine as set forth in claim 1, wherein said grinding load detecting means comprises:

means for detecting the load power of a motor driving said grinding wheel during said finish grinding operation.

3. A numerically controlled grinding machine as set forth in claim 2, wherein said load power detecting means of said grinding load detecting means comprises:

means for detecting a maximum load power of said motor in a first revolution of said workpiece during said finish grinding operation.

4. A numerically controlled grinding machine as set forth in claim 1, wherein said compensation value determining means comprises:

means for memorizing plural compensation values corresponding to the magnitude of said grinding load; and means for selecting one of said compensation values depending upon said grinding load detected by said grinding load detecting means.

5. A numerically controlled grinding machine as set forth in claim 4, wherein said compensating means comprises:

means for moving a spindlehead slide supporting said workpiece according to said determined compensation value in the successive rough grinding operation.

6. A numerically controlled internal grinding machine having a wheelhead slide supporting a rough grinding wheel and a finish grinding wheel and a spindlehead slide supporting a workpiece, in which relative movement is produced between said wheelhead and spindlehead slides and said workpiece according to numerical data in order to grind said workpiece by a rough grinding operation with said rough grinding wheel and a finish grinding operation with said finish grinding wheel, said numerically controlled grinding machine comprising:

means for detecting a grinding load of said finish grinding wheel at the beginning of said finish grinding operation in order to indirectly detect the amount of unground portion remaining after the rough grinding operation;

means for determining a compensation value based upon said grinding load detected by said grinding load detecting means; and means for compensating the relative positional relationship between said rough grinding wheel and said workpiece according to said determined compensation value in a next rough grinding operation for a next workpiece in order to keep the amount of unground portion remaining after the rough grinding operation constant.

7. A numerically controlled grinding machine as set forth in claim 6, wherein said grinding load detecting means comprises:

means for detecting the load power of a motor driving said finish grinding wheel during said finish grinding operation.

8. A numerically controlled grinding machine as set forth in claim 7, wherein said load power detecting means of said grinding load detecting means comprises:
means for detecting a maximum load power of said motor in a first revolution of said workpiece during said finish grinding operation.

9. A numerically controlled grinding machine as set forth in claim 6, wherein said compensation value determining means comprises:
means for memorizing plural compensation values corresponding to the magnitude of said grinding load; and
means for selecting one of said compensation values depending upon said grinding load detected by said grinding load detecting means.

10. A numerically controlled grinding machine as set forth in claim 9, wherein said compensating means comprises:
means for moving said spindlehead slide supporting said workpiece according to said determined compensation value in the successive rough grinding operation.

11. A method for grinding an internal surface of a workpiece with a rough grinding wheel and a finish grinding wheel, comprising:
relatively feeding said rough grinding wheel by a predetermined constant amount toward said internal surface in order to roughly grind said internal surface;
relatively feeding said finish grinding wheel toward said internal surface in order to finish said internal surface;
detecting the grinding load of said finish grinding wheel at the beginning of said finish grinding step in order to indirectly detect the amount of unground portion remaining after the rough grinding step;
determining a compensation value corresponding to said grinding load detected in said grinding load detecting step; and
compensating the relative positional relationship between said rough grinding wheel and said workpiece according to said determined compensation value in a next rough grinding operation for a next workpiece in order to keep the amount of unground portion remaining after the rough grinding operation constant.

* * * * *